United States Patent [19]

Matsuto

[11] Patent Number: 5,549,367
[45] Date of Patent: Aug. 27, 1996

[54] LIQUID PRESSURE CONTROLLER

[75] Inventor: Takushi Matsuto, Saitama, Japan

[73] Assignee: Honda Giken Kogyo Kabushiki Kaisha, Tokyo, Japan

[21] Appl. No.: 455,705

[22] Filed: May 31, 1995

[30] Foreign Application Priority Data

Sep. 30, 1994 [JP] Japan .................. 6-259578

[51] Int. Cl.⁶ ................... B60T 8/44; B60T 8/60; B60K 41/00
[52] U.S. Cl. ..................... 303/114.1; 60/538; 60/594
[58] Field of Search ................. 303/9.64, 113.4, 303/114.1, 137, 155; 60/538, 594

[56] References Cited

U.S. PATENT DOCUMENTS 5,236,257  8/1993  Monzaki et al. ............. 303/114.1
5,249,848  10/1993  Matsuto et al. ............. 303/137 X

FOREIGN PATENT DOCUMENTS 62-116346  5/1987  Japan .
63-64858  3/1988  Japan .
1-266050  10/1989  Japan .
3-220054  9/1991  Japan .

*Primary Examiner*—Josie Ballato
*Attorney, Agent, or Firm*—Birch, Stewart, Kolasch & Birch, LLP

[57] ABSTRACT

The liquid pressure controller includes an operating piston directly operated by a mechanical member such as a brake or clutch. An acting piston is connectable to the operating piston and directly acts for producing a liquid pressure of a portion to be operated. A liquid pressure controller connects the acting piston to the operating piston or releases the connection and actuates only the acting piston.

9 Claims, 11 Drawing Sheets

LIQUID PRESSURE CONTROLLER

BACKGROUND OF THE INVENTION

1. Field of the Invention

The present invention relates to a controller for controlling a liquid pressure for a brake or clutch of a vehicle or general machine.

2. Description of Background Art

The following examples of braking liquid pressure controllers have been known. The first example is disclosed in unexamined Japanese Patent Publication No. HEI 1-266050, wherein a detecting means is provided for electrically detecting an operating stroke amount and a load of a brake lever or brake pedal, and on the basis of a detection signal from the detecting means, an oil pressure control means controls the pressure of a caliper cylinder of a wheel brake. The second example is disclosed in Unexamined Japanese Patent Publication No. SHO 63-64858, wherein a master cylinder is provided for operating a caliper cylinder, and a braking liquid absorber and a liquid pressure generating means are switchably disposed between the master cylinder and the caliper cylinder. The third example is disclosed in Unexamined Japanese Patent Publication Nos. HEI 3-220054 and SHO 62-116346, wherein a liquid pressure generated in a master cylinder is boosted by a hydraulic circuit to be fed to a caliper cylinder upon a normal state, and the liquid pressure can be controlled by a switching means upon traction control and antilock brake control.

In the first example, not only the detecting means but also the oil pressure control means require high reliability. In some cases, a second brake or the like directly connected to an operating lever or the like is required.

In the second example, the mechanism including the braking liquid absorber, liquid pressure generating means and switching means for switching them is complicated. This is disadvantageous in terms of manufacturing cost and mounting space. Moreover, the switching means becomes a continuous operating state upon continuous braking such as upon stoppage. This is disadvantageous in terms of economy.

In the third example, the mechanism is further complicated and is difficult to be reduced in weight, size, and cost.

OBJECTS AND SUMMARY OF THE INVENTION

An object of the present invention is to provide a liquid pressure controller with a simple structure enabling various kinds of liquid pressure controls with high reliability.

To achieve the above object, according to the present invention, there is provided a liquid pressure controller including an operating piston directly operated by an input member, an acting piston which is connectable with the operating piston and directly acts on a liquid pressure in a portion to be operated, and a liquid pressure control means for connecting the acting piston to the operating piston, or for releasing the connection and actuating only the acting piston.

The above liquid pressure controller has a simple structure in which the operating piston is connectable to an acting piston, and the liquid pressure control means releases the connection and controls only the acting piston. Accordingly, it can achieve a reduction in size, weight and cost.

Since the operating piston is connectable to the acting piston directly responding to a liquid pressure of a portion to be operated, a liquid pressure imparting function can be usually ensured with high reliability.

Since the liquid pressure control means releases the connection and actuates only the acting piston, various liquid pressure controls can be performed on the basis of various states without operation of the operating piston.

The above liquid pressure controller further may include a means for detecting a vehicular state, wherein the liquid pressure control means receives a detection signal from the vehicular state detecting means, and drives an eccentric cam on the basis of the detection signal by means of a motor, thereby actuating the acting piston. This controller can be reduced in size and weight while ensuring high reliability.

The acting piston may be set to be coaxial with the operating piston, and to be larger in diameter than the operating piston. With this arrangement, the liquid pressure control means assists the operation of the input member, thus enabling a power-assist control.

The eccentric cam may include a lock position not to be driven by a reaction force applied to the operating piston, and can keep a liquid pressure imparting state. With this arrangement, upon imparting continuous liquid pressure, the motor can be stopped.

The vehicular state detecting means may detect the vehicular state for antilock braking control. With this arrangement, the antilock braking control can be made by drive of the eccentric cam by way of the motor.

The vehicular state detecting means may detect the slip state of a vehicle. With this arrangement, the traction control can be made by the drive of the eccentric cam by way of the motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

Hereinafter, one embodiment of the present invention will be described with reference to FIGS. 1 to 13.

Figure 1:
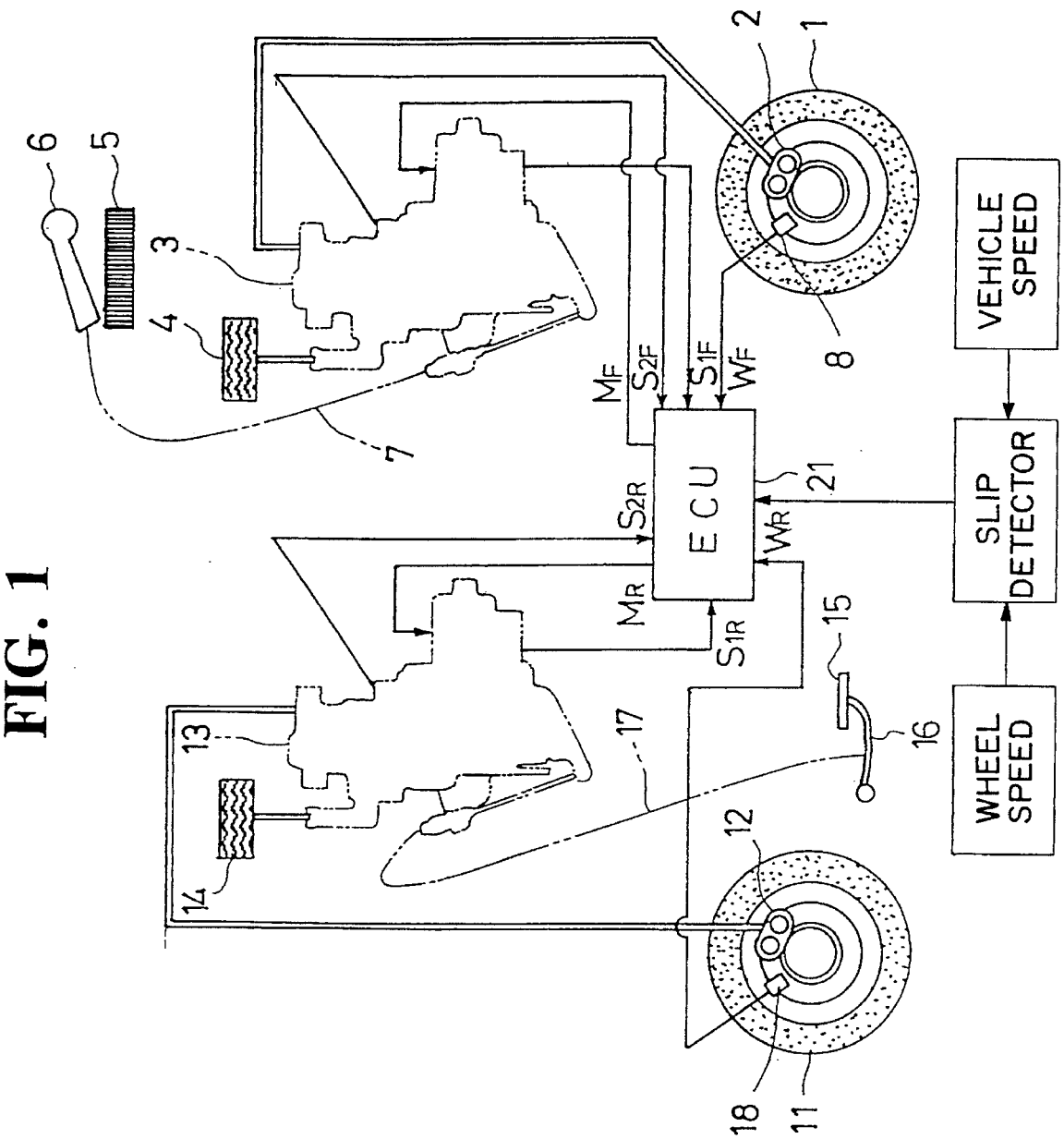
FIG. 1 is a view showing the whole construction of a braking system of a motorcycle according to one embodiment of the present invention.

In this embodiment, the present invention is applied to a braking mechanism of a motorcycle. FIG. 1 shows the whole construction of the braking system.

An front brake caliper 2 of a front wheel 1 is driven by a front master cylinder 3, and a rear brake caliper 12 of a rear wheel 11 is driven by a rear master cylinder 13.

The front brake caliper 2 is supplied with oil from a reservoir 4 and is operated by a brake lever 6 provided along a handle grip 5 by way of a brake cable 7. The rear brake caliper 12 is supplied with oil from a reservoir 14 and is operated by a brake pedal 16 provided in the vicinity of a foot-rest 15 by way of a brake cable 17.

Accordingly, the front wheel 1 and the rear wheel 11 have different brake systems which are respectively operated by the brake lever 6 and the brake pedal 16 by way of the master cylinders 3, 13. However, the master cylinders 3, 13 are centralized-controlled by an electronic control unit ECU 21.

Operational stroke amounts $S_{1F}, S_{1R}$ and control stroke amounts $S_{2F}, S_{2R}$ Of the master cylinders 3, 13 are detected and input in the ECU 21. Speed detection signals $W_F, W_R$, respectively, supplied from a front wheel speed sensor 8 provided on the front wheel 1 and a rear wheel speed sensor 18 provided on the rear wheel 11 are input in the ECU 12. A signal supplied from a sensor for detecting the state of the vehicle such as a vehicular speed sensor is also input in the ECU 21 for control of the master cylinders 3, 13.

The master cylinders 3, 13 have the same construction. Only the construction of the master cylinder 3 will be described with reference to FIGS. 2 to 8.

A cylinder main body 30 of the master cylinder 3 has a small diameter portion 30a, an intermediate diameter portion 30b and a large diameter portion 30c, which are slightly different from each other in inside diameter and which are disposed in this order. A first piston 41 as an operating piston is slidably fitted in the small diameter portion 30a. A second piston 42 is slidably fitted in the intermediate diameter portion 30b. A third piston 43 is slidably fitted in the large diameter portion 30c.

An opening portion of the cylinder main body 30 on the small diameter portion 30a side has a slightly enlarged inside diameter, and is formed with a cut-out 31 along the diameter from the edge. A boot 32 is interposed between the inside of the opening portion and the leading edge of the first piston 41.

A spring 33 is interposed between the first piston 41 and the second piston 42 for biasing both the pistons 41, 42 in the direction of separating them from each other, thereby forming a liquid pressure chamber 44. On the other hand, a head 34 having an output port 34a opened in the direction perpendicular to the cylinder axis is liquid-tightly connected to an opening of the large diameter portion 30c of the cylinder main body 30. On the side of the third piston 43, a liquid pressure chamber 45 is formed in the head 34. In the liquid pressure chamber 45, a spring 35 is interposed between the head 34 and the third piston 43 for biasing the third piston 43 toward the second piston 42.

Figure 3:
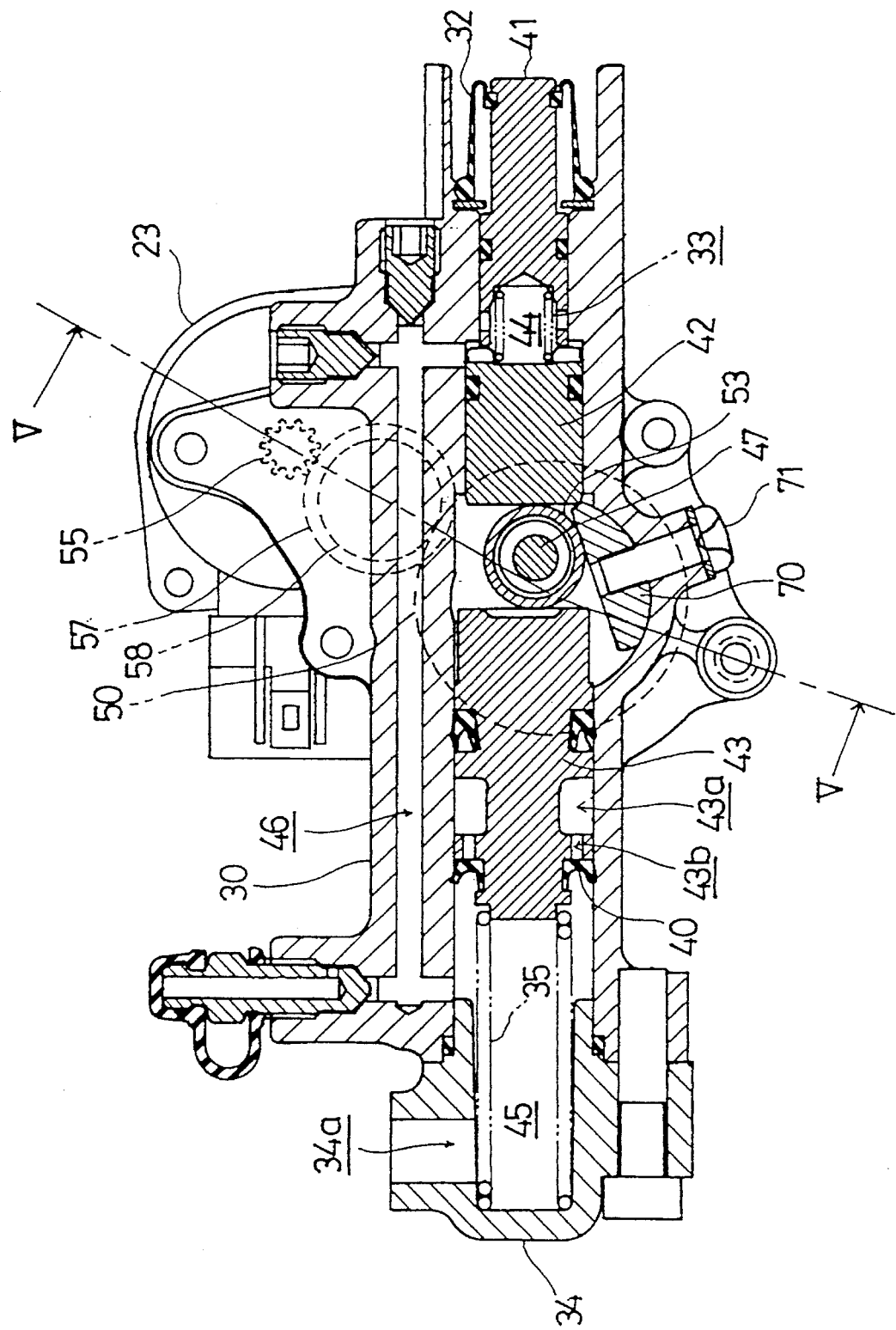
FIG. 3 is a sectional view taken along line III—III of FIG. 2.
Figure 4:
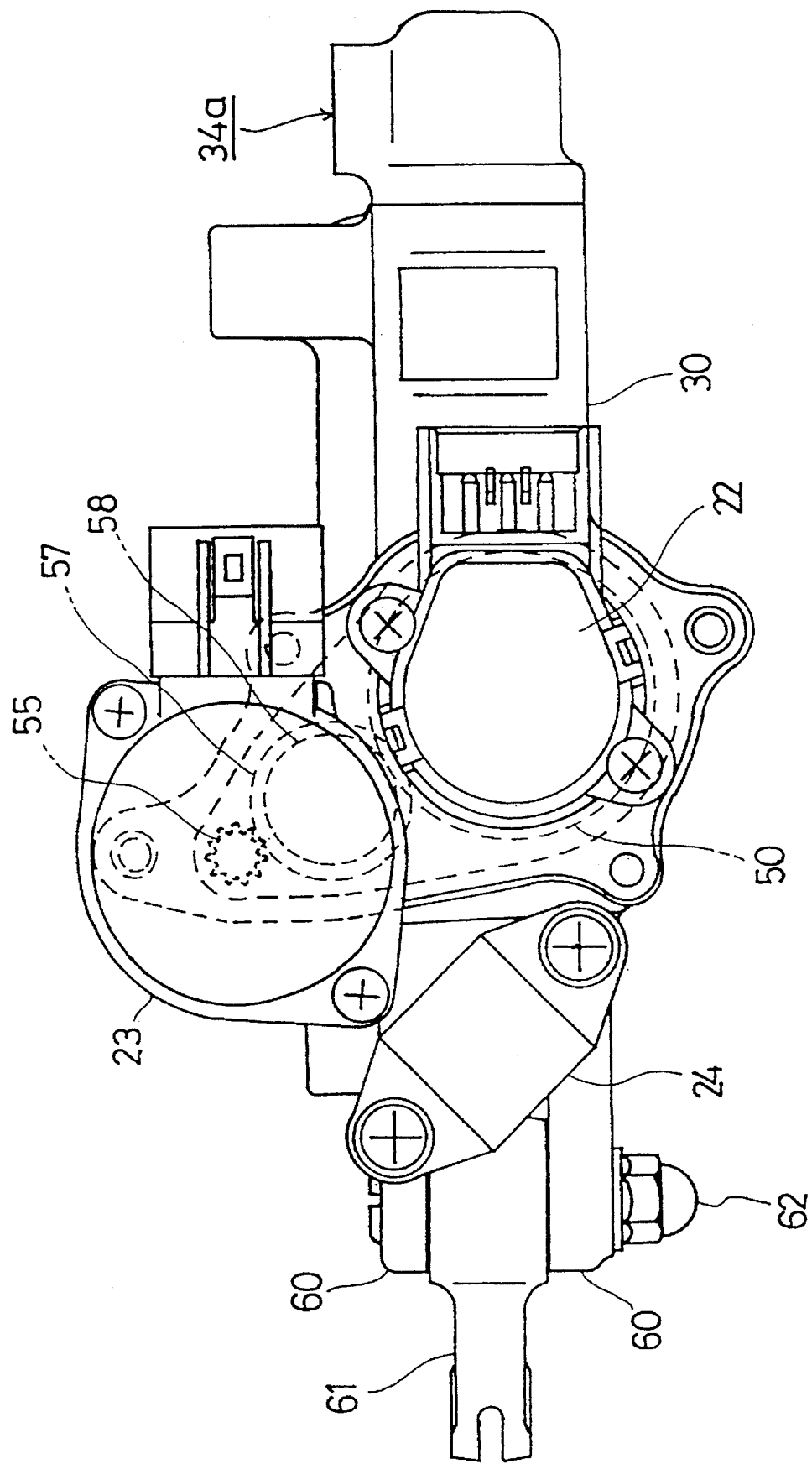
FIG. 4 is a view seen from the arrow IV of FIG. 2.
Figure 8:
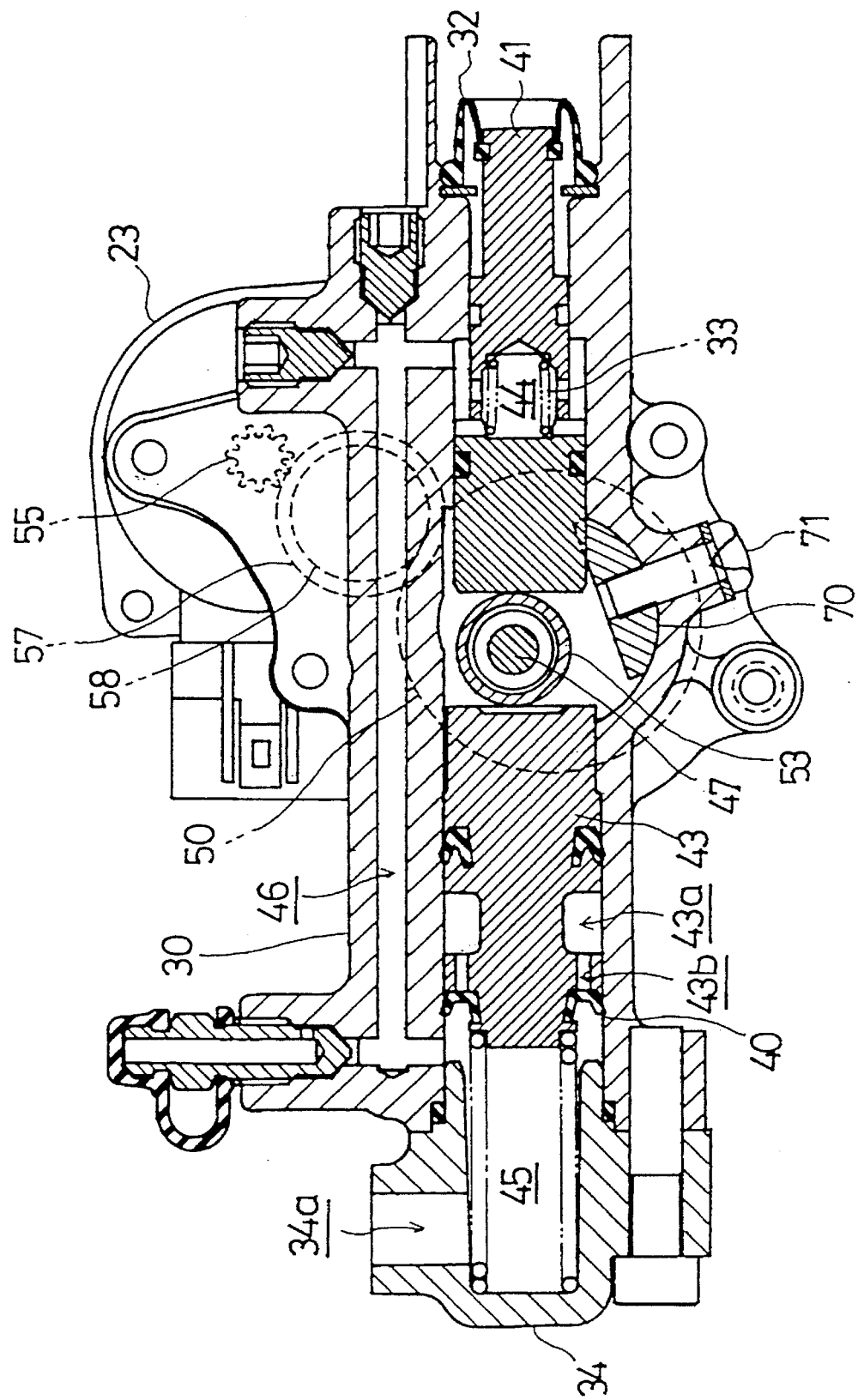
FIG. 8 is a sectional view taken along line VIII—VIII of FIG. 7.

The liquid pressure chamber 44 is communicated to the liquid pressure chamber 45 by way of a communication passage 46, see FIGS. 3 and 8. A circumferential groove 43a is formed around the outer peripheral surface of the third piston 43 at a specified position. The circumferential groove 43a is communicated to the liquid pressure chamber 44 by way of a communication passage 43b, see FIGS. 3 and 8, and an annular one-way valve body 40 is provided to block an opening of the communication passage 43b on the liquid pressure chamber 45 side in one direction, from the circumferential groove 43a to the liquid pressure chamber 45.

Figure 2:
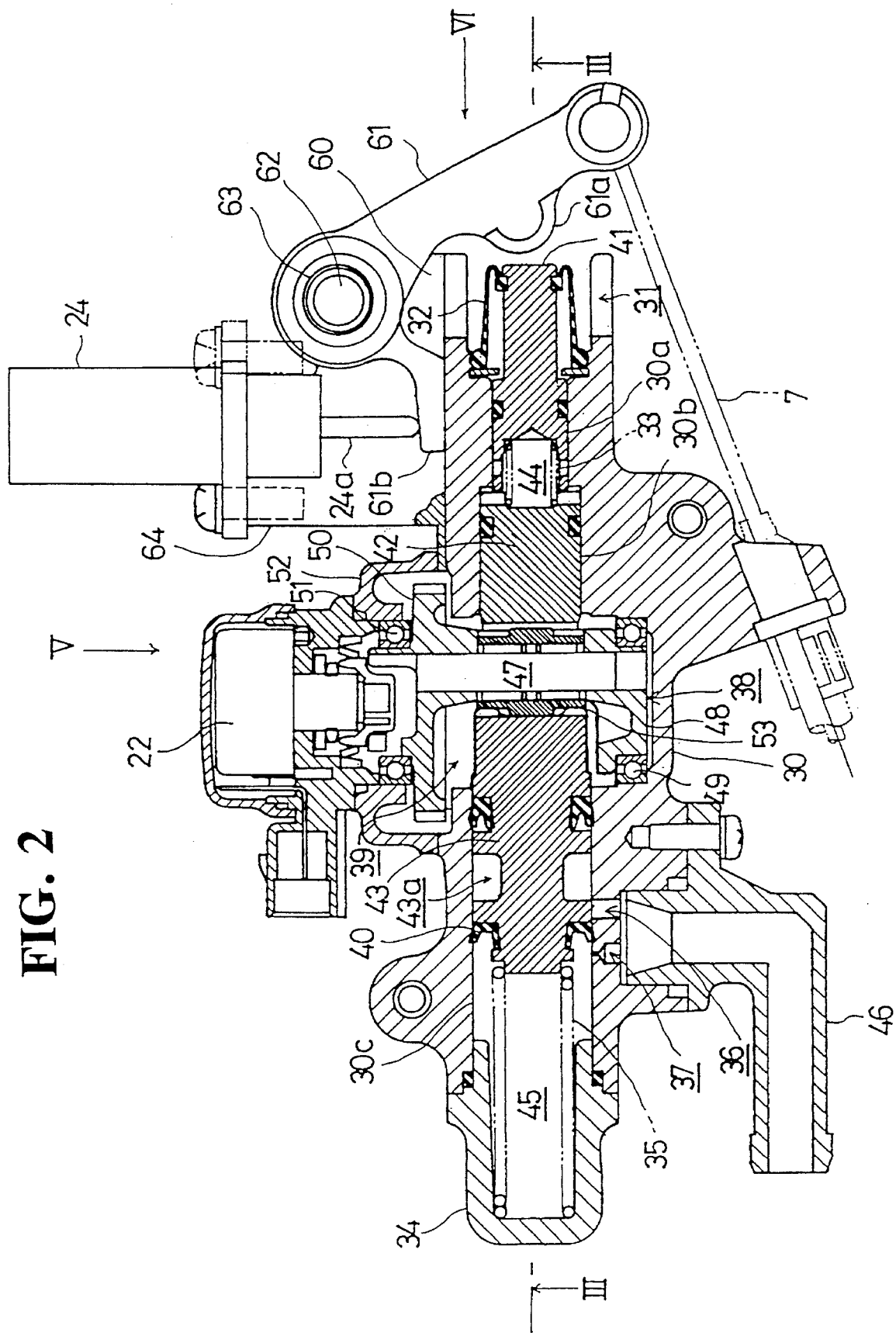
FIG. 2 is a sectional view showing the structure of a master cylinder according to the embodiment.

A small diameter input port 36 and a control port 37 having an orifice are juxtaposed in the large diameter portion 30c of the cylinder main body 30, and a connector 46 communicated to the reservoir 4 is connected to both the ports 36, 37. In FIG. 2, by movement of the third piston 43, the right side input port 36 is blocked by the piston 43 itself, see FIG. 2, or communicated to the circumferential groove 43a, see FIG. 7, while the left side control port 37 is communicated to the liquid pressure chamber 44, see FIG. 2, or blocked by the third piston 43 itself, see FIG. 7.

In the large diameter portion 30c of the cylinder main body 30 at the position near the intermediate diameter portion 30b, a bottomed circular hole 38 and a though-circular hole 39 are formed on opposite side walls. A crank shaft 47 passes through the circular holes 38 and 39. One end of the crank shaft 47 is eccentrically fitted to a disk 48, and the disk 48 is rotatably supported in the circular hole 38 by way of a bearing 49. The other end of the crank shaft 47 is eccentrically fitted to a gear 50 having the same rotating axis as that of the disk 48. The gear 50 is rotatably supported by an annular supporting member 52 mounted in the circular hole 39 by way of a bearing 51.

The crank shaft 47 is fitted in a cylindrical bearing between the second piston 42 and the third piston 43. An inner race of the bearing 53 is integrated with the crank shaft 47, and it is turned together with the disk 48 and the gear 50. The rotatable outer race of the bearing abuts the second piston 42 and the third piston 43 for imparting movement thereto.

An angle sensor 22 is supported by the supporting member 52 for detecting a rotational angle of the gear 50, that is, the turning angle of the crank shaft 47.

The second piston 42 is biased by the spring 33 and usually abuts the bearing 53 of the crank shaft 47, while the third piston 43 is biased by a spring 35 and usually abuts the bearing 53 of the crank shaft 47 so that the second and third pistons 42, 43 are moved in the same direction by the same movement amount by the turning of the crank shaft 47.

The movement amount $S_{2F}$ is calculated on the basis of a turning angle of the crank shaft 47 detected by the angle sensor 22.

Figure 5:
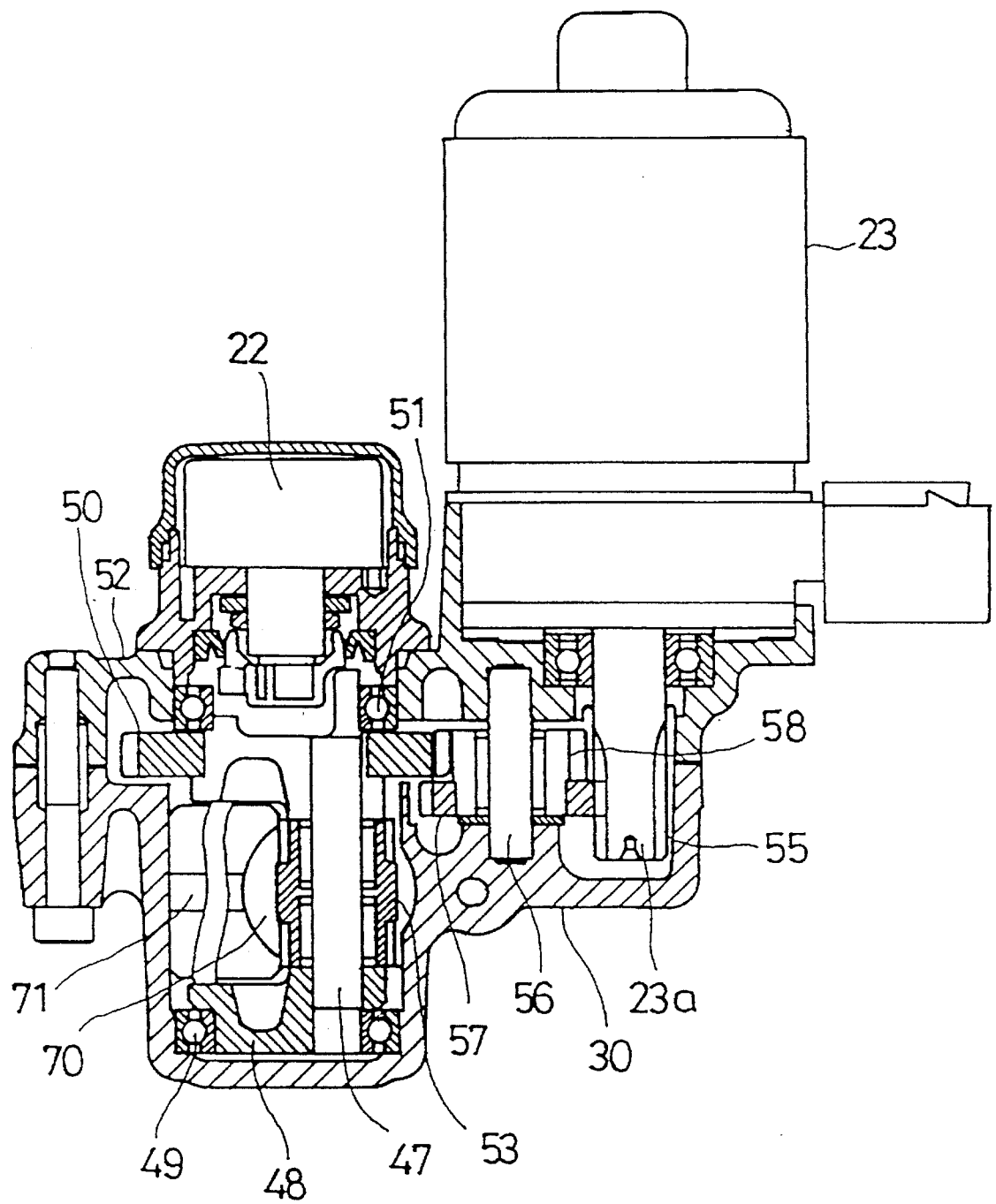
FIG. 5 is a sectional view taken along line V—V of FIG. 3.

As shown in FIG. 5, a drive shaft 23a of a motor 23 mounted near the angle sensor 22 projects in parallel to the crank shaft 47. A gear 57 fitted on a rotating shaft 56 is meshed with a drive gear 55 fitted on the drive shaft 23a. A gear 58 fitted on the rotational shaft 56 is meshed with the gear 50 integrated with the crank shaft 47.

The second and third pistons 42, 43 can be thus moved by turning the crank shaft 47 by means of the motor 23 through the gears 57, 58, 50.

A rotation stopper 70 for restricting the turning of the crank shaft within a specified angle is fixed at a position to abut the bearing 53 by fastening a screw 71 from the outside.

Figure 6:
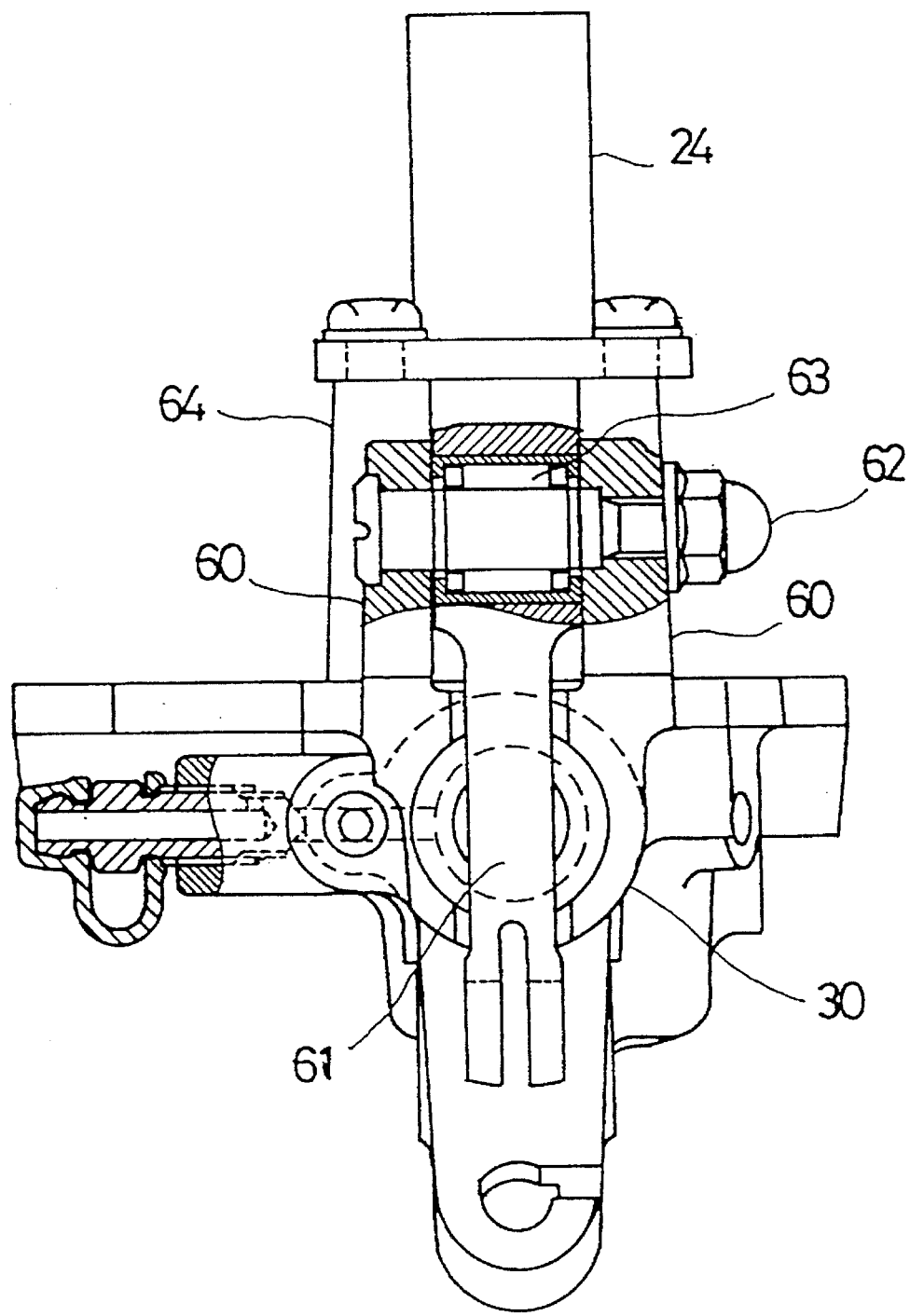
FIG. 6 is a view seen from the arrow VI of FIG. 2 with parts partially cut-away.

A pair of supporting brackets 60, 60 oppositely project from the side end portion of the small diameter portion 30a of the cylinder main body 30, see FIG. 6, and between the supporting brackets 60, 60, a control lever 61 is rockably provided with the base end portion thereof pivotally supported by a supporting shaft 62 by way of a bearing 63.

The end portion of the brake cable 7 connected to the brake lever 6 is connected to the free end portion of the control lever 61. A swell portion 61a is formed at the intermediate portion of the control lever 61. The swell portion 61a faces to the first piston 41 at the opening of the end portion of the cylinder main body 30 on the small diameter portion 30aside. The control lever 61 is fitted in the cut-out 31 at the opening end of the cylinder main body 30 and is rocked, so that the swell portion 61a abuts the first piston 41 and can push the first piston 41.

A projecting piece 61b extends along the outer surface of the cylinder main body 30 from the pivotally supporting portion of the base end of the control lever 61. A stroke sensor 24 is supported by a supporting member 64 over the projecting piece 61b. The leading edge of a rod 24a projecting from the stroke sensor 24 abuts the upper portion of the projecting piece 61b.

Accordingly, when the brake lever 6 is operated and the control lever 61 is rocked by way of the brake cable 7, the swell portion 61a of the control lever 61 is moved in such a manner as to push the first piston 41. At the same time, the projecting piece 61b of the control lever 61 allows the rod 24a of the stroke sensor 24 to be slid, thereby detecting the stroke of the control lever 61.

The movement amount $S_{1F}$ of the first piston 41 is calculated on the basis of the stroke of the control lever detected by the stroke sensor 24.

The master cylinder 3 in this embodiment has the above-described simple structure, and accordingly, it can be reduced in size, weight and cost.

With the above-described structure, the first piston 41 is moved by operation of the brake lever 6, and the movement amount $S_{1F}$ is detected by the stroke sensor 24 and the input is supplied to the ECU 21. Subsequently, on the basis of a control signal $M_F$ from the ECU 21, the motor 23 is driven for moving the second and third pistons 42, 43. The movement amount $S_{2F}$ of the second and third pistons 42, 43 is detected by the angle sensor 22 and input in the ECU 21 for feedback control.

The master cylinder 13 for braking the rear wheel 11 is the same structure as described above.

With respect to the movement of the piston, it is assumed that, in FIG. 2, the counterclockwise movement is taken as "advance," and the clockwise movement is taken as "retreat."

In the condition of the master cylinder 3 shown in FIGS. 2 to 6, the motor 23 is not driven and the brake lever 6 is not operated. In FIGS. 2 and 3, the crank shaft 47 is restricted by the rotation stopper 70, and is positioned on the most right side so that the first piston 41 and the second piston 42 are contacted with each other and are located at the most retreating position. The third piston is biased by the spring 35 and is also restricted by the crank shaft 47 to be thus located at the most retreating position.

The input port 36 connected to a breather 4 is blocked by the third piston 43, but the control port 37 is communicated to the liquid pressure chamber 45 so that no oil pressure is generated in the liquid pressure chamber 45 and the brake caliper 2 is not operated.

As shown in FIG. 2, before operation of the brake lever 6, the swell portion 61a of the control lever 61 is located so as to be separated from the leading edge of the first piston 41 at a slight gap for giving a slight play to the starting operation of the brake lever 6.

When the brake lever 6 is operated in the power-off state where the motor 23 is not operated, the control lever 61 is rocked by way of the brake cable 7 and the swell portion 61a abuts the leading edge of the first piston 41 to advance the first piston 41, and simultaneously to advance the second piston 42 contacted with the first piston 41. The second piston 42 advances the third piston 43 against the spring 35 while turning the crank shaft 47.

Namely, the first, second and third pistons 41, 42, 43 advances by the same movement amount.

Figure 7:
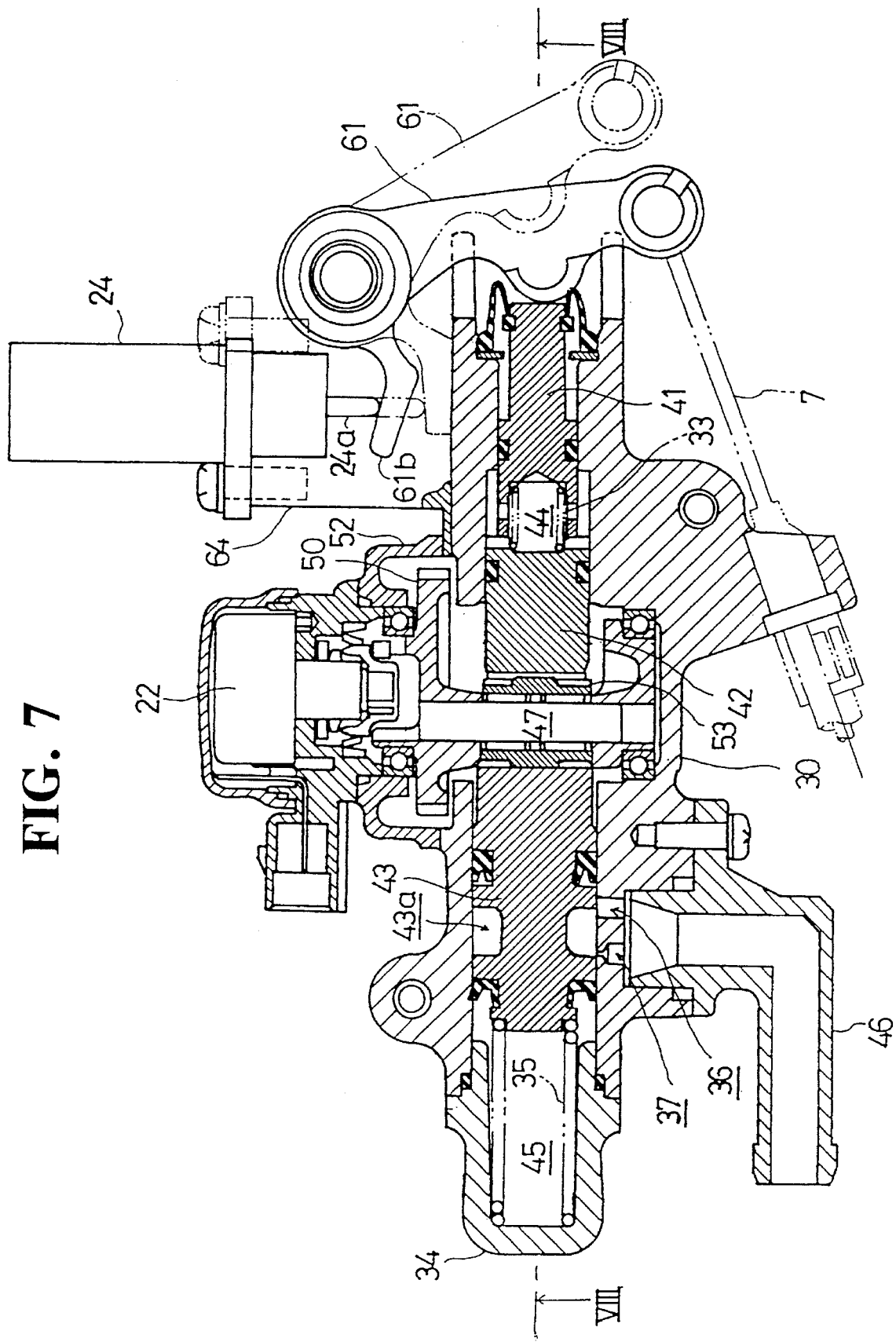
FIG. 7 is a sectional view showing another state of the sectional structure shown in FIG. 2.

When the third piston 43 advances as shown in FIGS. 7 and 8, the control port 37 is blocked by the third piston 43 to generate an oil pressure in the liquid pressure chamber 45, and the oil pressure is supplied from the output port 34a to the brake caliper 2, thus braking the front wheel 2.

In addition, the oil pressure is prevented from escaping from the communication passage 43 to the circumferential groove 43a.

Letting $A_1$, $A_2$ and $A_3$ be the sectional areas of the first, second and third pistons 41, 42 and 43, the amount of oil (corresponding to the piston movement amount $S_1$) supplied to the brake caliper 2 when the brake lever 6 is operated in the power-off state is as follows:

Of the amount $(A_3 \times S_{1F})$ of oil generated in the liquid pressure chamber 45 having the input port 34a by the third piston 43, the amount $\{(A_2-A_1) \times S_{1F}\}$ of oil flows from the liquid pressure chamber 45 to the liquid pressure chamber 44 by way of the communication passage 46, as a result of which the amount of oil supplied to the brake caliper becomes $\{(A_3-A_2+A_1) \times S_{1F}\}$.

Since the first, second and third pistons 41, 42, 43 are integrally moved, the receiving load of the first piston 41, that is, the reaction force of the control lever 61 becomes $(A_3 \times P)$ where P indicates an oil pressure in the liquid pressure chamber 45.

Figure 9:
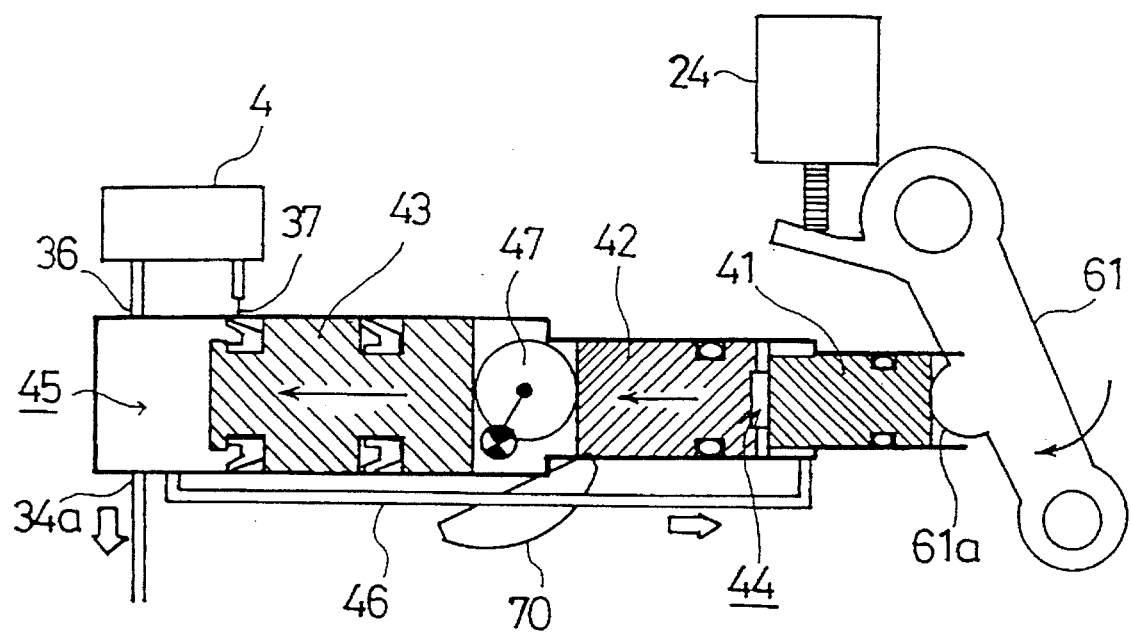
FIG. 9 is a typical view of a master cylinder in the state shown in FIGS. 7 and 8.

FIG. 9 is a typical view showing the condition in which the brake lever 6 is operated in the power-off state. The input port 36 is positioned on the front side from the control port 37, which is different from the actual condition. However, this corresponds to the actual action if the input port 36 includes a one-way valve allowing only the flow of oil in one direction from the reservoir 4 to the liquid pressure chamber 45.

The first, second and third pistons 41, 42, 43 are moved by the movement amount $S_{1F}$ by the rocking of the control lever 61.

When the brake lever 6 is released, the rocking of the control lever 61 is eliminated, and the first, second and third pistons 41, 42, 43 are all returned by the spring 35, thus releasing the braking.

The oil necessary for this return is supplied from the reservoir 4 into the liquid pressure chamber 45. As described above, the manual braking is positively performed upon the power-off state, so that the braking function can be usually ensured at high reliability irrespective of the motor-driven liquid pressure control system.

The power-assist control will be described below with reference to FIG. 10.

When the brake lever 6 is operated in the power-on state enabling the drive of the motor 23 and the control lever 61 is rocked, the motor 23 is driven before the swell portion 61a of the control lever 61 is contacted with the first piston 41. The crank shaft 47 is turned by the drive of the motor 23 and advances the second and third pistons 42, 43. At this time, the first piston 41 remains by the spring 33 and the second piston 42 advances to thereby extend the liquid pressure chamber 44.

The advance of the third piston 43 blocks the control port 37, and an oil pressure is generated in the liquid pressure chamber 45.

Figure 10:
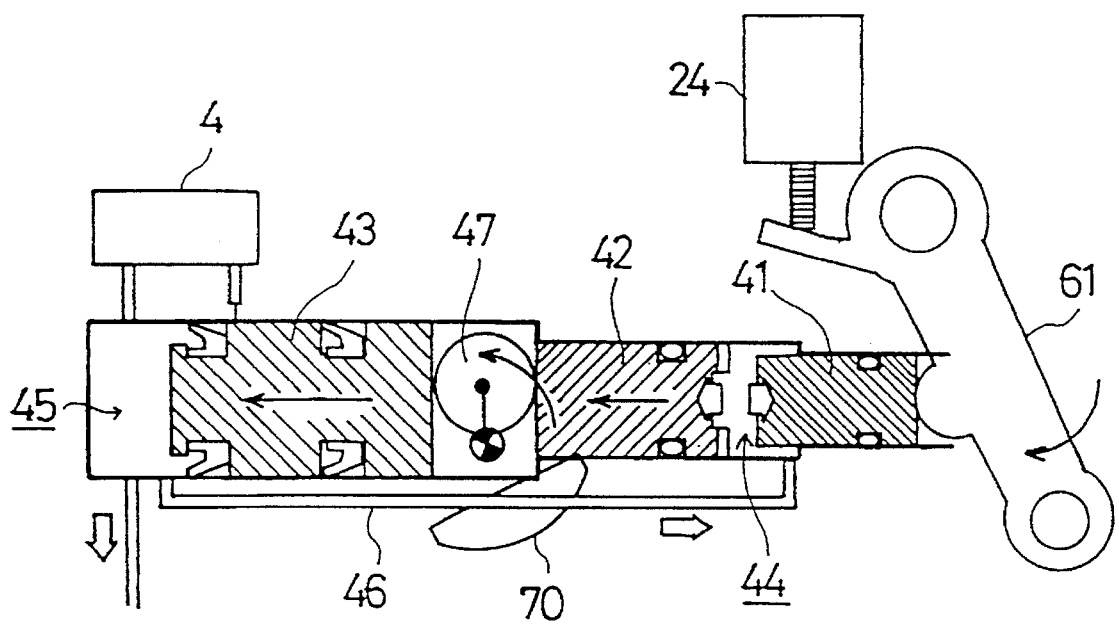
FIG. 10 is a typical view of the master cylinder showing a power-assist control state.

After that, the first piston 41 advances, in the state shown in FIG. 10, by the rocking of the control lever 61, and the second and third pistons 42, 43 further advance by way of the oil pressure in the liquid pressure chamber 44 to thus supply the oil pressure in the liquid pressure chamber 45 to the brake caliper 2.

Letting $S_{2F}$ be the movement amount of the second and third pistons 42, 43, and $S_{1F}$ be the movement amount of the first piston 41, the amount of oil supplied to the brake caliper 2 becomes $\{(A_3-A_2)xS_{2F}+A_1xS_{1F}\}$ because the amount $(A_3 x\, S_{2F})$ of oil is supplied by the movement of the third piston 43. The mount $(A_2 S_{2F})$ of oil is returned by the movement of the second piston 42 through the communication passage 46, and the amount $(A_1 x S_{1F})$ is supplied on the liquid pressure chamber 45 side by the movement of the first piston 41.

The reaction of the control lever 61 is generated by way of the oil pressure in the liquid pressure chamber 44, and becomes $(A_1 xP)$, which is smaller than the value $(A_3 xP)$ at the time when the motor 23 is not driven upon the power-off state, that is, exhibits the power-assist.

The antilock brake control will be described below with reference to FIGS. 1 and 11.

When the wheel slip state is detected by a slip detector on the basis of a vehicular body speed and wheel speed at the time of braking during operation, the crank shaft 47 is reversely rotated by the motor to retreat the advancing second and third pistons 42, 43.

Oil supplied to the brake caliper 2 is returned into the liquid pressure chamber 45, and the effect of the braking is weakened, thus preventing the wheel slip state.

The liquid pressure chamber 44 is contracted by the retreat of the second and third pistons 42, 43. However, the oil pressure is applied to assist the motor 23 until the second piston 42 is contacted with the first piston 41, thus ensuring a high responsiveness.

If $F_{12}$ is a load of the spring 33 and $F_3$ is a load of the spring 35, a load necessary for advancement of the second and third pistons 42, 43 becomes $\{F_{12}-F_3-(A_3-A_2)xP\}$. This load is negative and acts to assist the reverse rotation of the motor 23.

Figure 11:
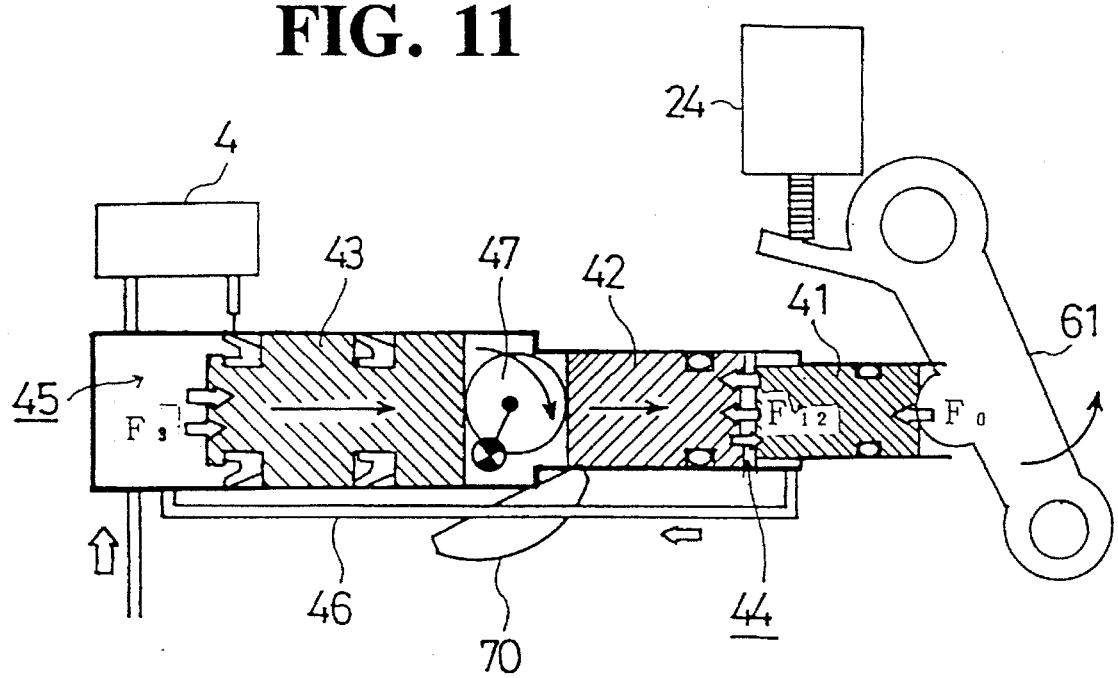
FIG. 11 is a typical view of the master cylinder showing an antilock brake control state.

When the pressure is not sufficiently reduced even by retreating the second piston 42 until it is contacted with the first piston 41 and the slip state cannot be avoided, the motor 23 is further reversely rotated to forcibly retreat the first piston 41, the state shown in FIG. 11.

In addition, a load necessary for advancement of the second and third pistons 42, 43 after the second piston 42 is contacted with the first piston 41 becomes $\{F_1+F_{12}-F_3-(A_3-A_2+A_1)xP\}$ where $F_0$ indicates a load applied to the first piston 41 by the control lever 61.

Although the foregoing relates to the master cylinder 3 corresponding to the front wheel, the same control can be made with respect to the master cylinder 13 corresponding to the rear wheel 11.

Figure 12:
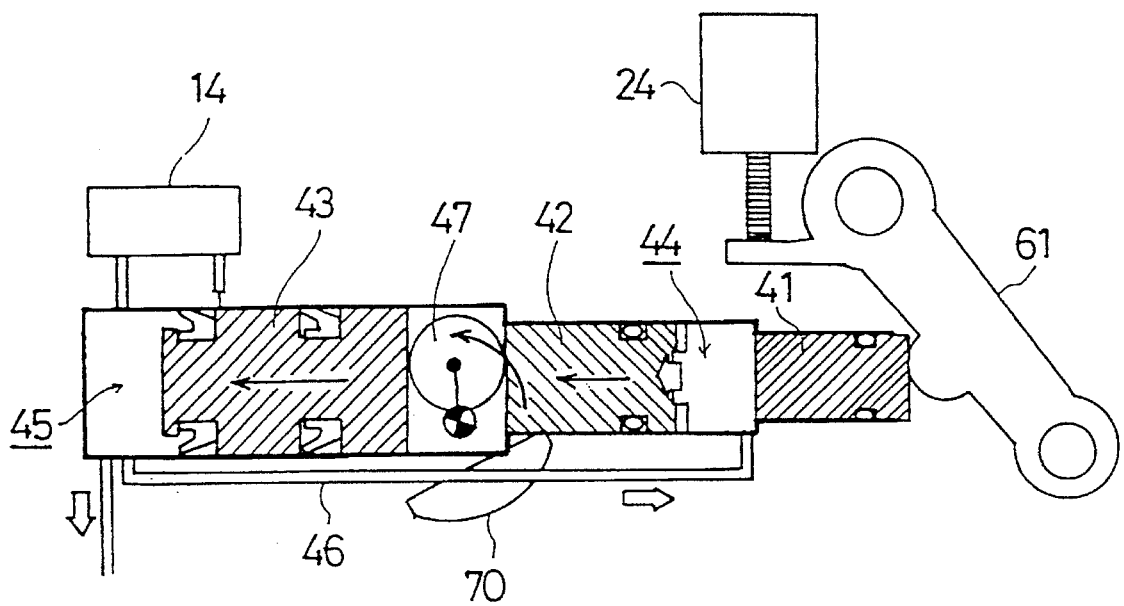
FIG. 12 is a typical view of the master cylinder showing a traction control and an interconnecting control state.

The traction control will be described with reference to FIG. 12. FIG. 12 shows the master cylinder 13 corresponding to the rear wheel. The same numerals as those in the description of the master cylinder 3 are used in FIG. 12.

For a motorcycle, the rear wheel 11 is a drive wheel, and when the slip state of the drive wheel is detected on the basis of a drive wheel speed $W_r$ and a vehicular body speed, the motor 23 is controlled to be driven for turning the crank shaft 47, which allows the second and third pistons 42, 43 to advance or retreat, the state shown in FIG. 12, thus generating the braking liquid pressure corresponding to the slip state.

The amount of oil supplied to the brake caliper 12 is $(A_3-A_2)xS_{2R}$. The movement amount $(A_3-A_2)xS_{2R}$ is controlled by the drive of the motor, and the slip state is avoided by a suitable braking liquid pressure.

In the motorcycle in this embodiment, the front and rear wheels 1, 11 have the master cylinders 3, 13 having the same structure, thereby enabling the interconnecting control therebetween. The motor of the master cylinder can be driven such that, on the basis of a detection signal of the stroke sensor on the side where the lever operation is made, the other braking liquid pressure on the other side where the lever operation is not made becomes a predetermined value or ratio.

The state of the master cylinder on the side where the lever operation is not made is the same as that shown in FIG. 12. A parking control can be made in this embodiment.

Figure 13:
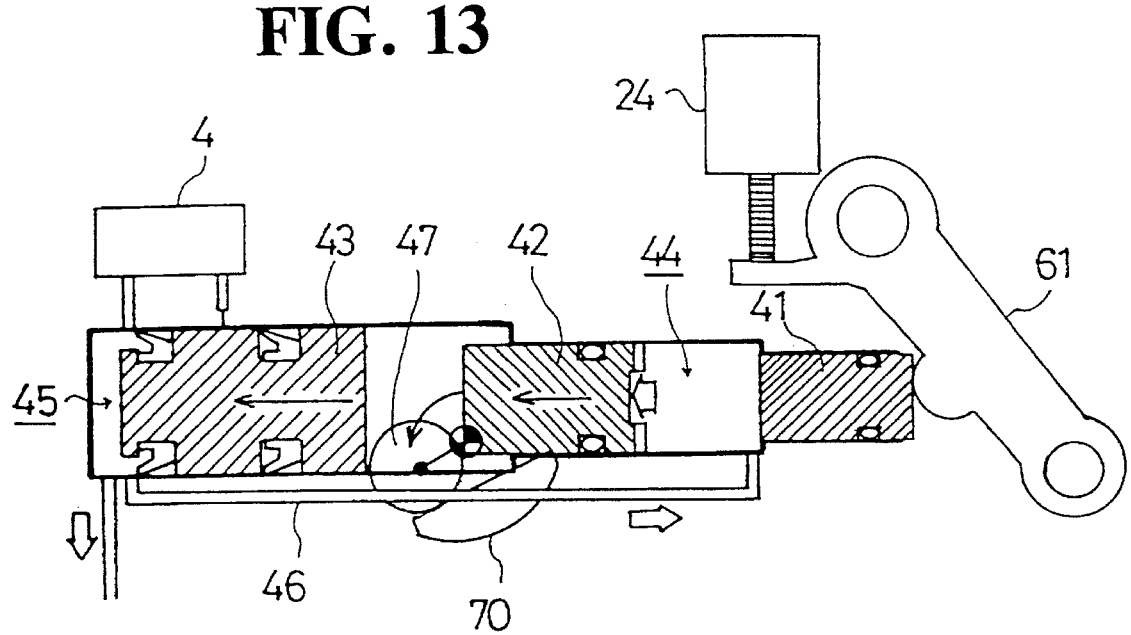
FIG. 13 is a typical view of the master cylinder showing a parking lock state.

As shown in FIG. 13, when the motor 23 is normally rotated until the crank shaft 47 abuts the rotation stopper 70, the line rocking by the turning of the crank shaft 47, which is formed by connecting the turning center to the center of the crank shaft 47, is tilted exceeding the line parallel to the longitudinal movement direction of the piston, that is, the top dead point, so that even if the drive current applied to the motor 23 is stopped to retreat, the third piston 43 by the oil pressure in the liquid pressure chamber 45 and the spring 35, the crank shaft 47 restricted by the rotation stopper 70 cannot be turned, and thereby the braking liquid pressure can be held with no power consumption.

Accordingly, for example, when the operation of the handle lock or the like is detected, the crank shaft 47 may be normally rotated by the drive of the motor 23 until it abuts the rotation stopper 70. In such a state, even when the supply of current to the motor 23 is stopped, the braking liquid pressure can be held and the parking lock state can be kept.

In this embodiment, the present invention is applied to the braking control. However, it may be applied to the clutch control, and general machines other than a vehicle.

The above liquid pressure controller of the present invention has a simple structure in which the operating piston is connectable to an acting piston, and the liquid pressure control means releases the connection and controls only the acting piston, and accordingly it can achieve a reduction in size, weight and cost.

Since the operating piston is connectable to the acting piston directly acting to a liquid pressure of a portion to be operated, a liquid pressure imparting function can be usually ensured at high reliability.

Since the liquid pressure control means releases the connection and actuates only the acting piston, various liquid pressure controls can be performed on the basis of various states without operation of the operating piston.

The above liquid pressure controller further may include a means for detecting a vehicular state wherein the liquid pressure control means receives a detection signal from the vehicular state detecting means, and drives an eccentric cam on the basis of the detection signal by means of a motor, thereby actuating the acting piston. This controller can be reduced in size and weight while ensuring high reliability.

The acting piston may be set to be coaxial with the operating piston and to be larger in diameter than the operating piston. With this arrangement, the liquid pressure control means assists the operation of the input member, thus enabling a power-assist control.

The eccentric cam may include a lock position not to be driven by a reaction force applied to the operating piston, and can keep a liquid pressure imparting state. With this arrangement, upon imparting continuous liquid pressure, the motor can be stopped.

The vehicular state detecting means may detect the vehicular state for antilock braking control. With this arrangement, the antilock braking control can be made by driving an eccentric cam by way of the motor.

The vehicular state detecting means may detect the slip state of a vehicle. With this arrangement, the traction control can be made by driving of the eccentric cam by way of the motor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid pressure controller comprising:

a master cylinder including a first diameter portion, a second diameter portion and a third diameter portion;

a first piston operatively mounted for reciprocation with said first diameter portion of said master cylinder;

a second piston operatively mounted for reciprocation with said second diameter portion of said master cylinder;

a third piston operatively mounted for reciprocation with said third diameter portion of said master cylinder;

a motor operatively connected to said second and third pistons for imparting motion to said second and third pistons to selectively move in at least one of a first predetermined direction and second predetermined direction;

an operating member operatively connected to said first piston for selectively imparting motion thereto and generating a first signal;

a controller for receiving said first signal and supplying a control signal to said motor for driving said second and third pistons in said first predetermined direction for supplying a predetermined liquid pressure corresponding to the motion imparted by said operating member; and a rotation stopper engaged by a cam connected to said motor when said motor rotates to a predetermined extent for locking said second and third pistons in a predetermined position.

2. The liquid pressure controller according to claim 1, and further including a slip detector for providing a signal to said controller for supplying a slip control signal to said motor for driving said second and third pistons in said second predetermined direction for reducing the predetermined liquid pressure generated by the corresponding motion imparted by said operating member.

3. The liquid pressure controller according to claim 1, and further including a traction control for providing a signal to said controller for supplying a traction control signal to said motor for driving said second and third pistons in at least one of said first predetermined direction and said second predetermined direction for selectively reducing the predetermined liquid pressure generated by the corresponding motion imparted by said operating member and increasing the predetermined liquid pressure, respectively.

4. The liquid pressure controller, according to claim 1, and further including a biaser disposed between said first and second pistons for biasing said first and second pistons in a direction of separation to form a liquid pressure chamber therebetween.

5. The liquid pressure controller according to claim 1, and further including a biaser disposed between said master cylinder and said third piston for biasing said third piston towards the second piston.

6. The liquid pressure controller according to claim 1, and further including a communication passage selectively communicating liquid pressure from a chamber formed between said master cylinder and said third piston to a chamber formed between said first piston and said second piston.

7. The liquid pressure controller according to claim 1, wherein said first, second and third pistons are coaxial with each other and said second and third pistons are larger in diameter relative to said first piston.

8. The liquid pressure-controller according to claim 1, wherein said cam is an eccentric cam including a lock position wherein the eccentric cam is not driven by a reaction force applied to said first piston, and said eccentric cam can be maintained in a liquid pressure imparting state.

9. The liquid pressure controller according to claim 1, wherein said first piston activates at least one of a brake and a clutch.

* * * * *